United States Patent [19]

Kyouya et al.

[11] Patent Number: 5,642,233
[45] Date of Patent: Jun. 24, 1997

[54] OPTICAL DEVICE

[75] Inventors: Shouichi Kyouya, Kakuda; Miki Ono, Miyagi-ken, both of Japan

[73] Assignee: Alps Electric Co., Ltd., Tokyo, Japan

[21] Appl. No.: 357,844

[22] Filed: Dec. 13, 1994

Related U.S. Application Data

[62] Division of Ser. No. 132,070, Oct. 4, 1993, Pat. No. 5,459,802.

[30] Foreign Application Priority Data

Oct. 2, 1992 [JP] Japan ................... 4-289282

[51] Int. Cl.$^6$ .................................. G02B 13/18
[52] U.S. Cl. ............................ 359/718; 359/718
[58] Field of Search ........................ 359/708, 718, 359/719

[56] References Cited

U.S. PATENT DOCUMENTS 5,077,819  12/1991  Greil et al. ................... 385/79

Primary Examiner—Scott J. Sugarman
Attorney, Agent, or Firm—Guy W. Shoup; Patrick T. Bever

[57] ABSTRACT

A light image is made irregular at an incident part of a fiber, influence of displacement of the fiber against a couping efficiency is reduced and evaluation of a lens can be carried out as usual. A light source is arranged at the optical surface side 14 of the lens 12 to be used, a focusing is formed at the second optical surface 15, the evaluation of the lens 12 is carried out by checking whether or not the surface aberration at the focusing position is less than the predetermined value. At this time, when the lens 12 is used in the optical device, the light source 1 is arranged with the second optical surface 15 being applied as a short focal point side and then the incident part for the fiber 3 is arranged with the first optical surface 14 being applied as the long focal point side. The lens 12 manufactured in such a way that the surface aberration is less than the specified value is arranged oppositely in the optical device, the surface aberration at the incident part for the fiber 3 is increased to cause the image to be irregular formed. Thus, the variation of the optical coupling efficiency against the displacement between the laser beam and the fiber is reduced.

1 Claim, 3 Drawing Sheets

OPTICAL DEVICE

This application is a division of application Ser. No. 08/132,070, filed Oct. 4, 1993 now U.S. Pat. No. 5,459,802.

BACKGROUND OF THE INVENTION

1. Field of the Invention

This invention relates to an optical device such as a lens used in a bar-code reader or an image scanner for converging light from a light emitting element (a light source) to a recording surface and reading its reflected light at a light receiving part, or a lens for converging light from a light source such as a laser diode and inputting it to an optical fiber.

2. Description of the Related Art

FIG. 4 is an illustrative view for showing an optical device and FIG. 5 is also an illustrative view for showing an evaluating process of the lens to be used in an optical coupler device.

The optical device shown in FIG. 4 is comprised of a light source 1 composed of a laser diode, a lens 2 for focusing the light emitted from the light source 1 and an optical fiber 3 having an end surface 3a for receiving the focused light passed through the lens 2.

In this optical device, the light from the light source 1 is magnified and projected toward the end surface 3a of the fiber 3 at a predetermined magnification, although as the diameter of the beam projected against the end surface 3a of the fiber 3 approaches the diameter of the mode field of the fiber 3, the coupling efficiency of light with respect to the fiber 3 is increased.

For example, it is known in general that the laser diode to be used in optical communications may produce a laser beam with a half-angle of divergence $\theta$ of 30° at its vertical and lateral widths, although it is assumed that the laser beam is focused by the lens 2 onto the end surface 3a of the fiber 3 having a diameter of about 10 μm under a magnification of about 5 times. The coupling efficiency $\eta$ at the fiber 3 can be expressed as follows, $$\eta = \eta_1 \times \eta_2$$

where $\eta_1$ is an incident coefficient of light of the light entering into an effective diameter of the lens 2, and $\eta_2$ is a mode coupling coefficient between the focused laser beam and the fiber 3.

In this case, the value $\eta_1$ is defined in response to the characteristic of the radiating angle of the laser beam and the numerical aperture NA of the effective diameter of the lens. The mode coupling coefficient $\eta_2$ is defined as $$\eta_2 = \frac{4}{\left(\frac{\omega_f}{\omega_1} + \frac{\omega_1}{\omega_f}\right)^2}$$

where $\omega_f$ is a mode field radius of the fiber 3 and $\omega_1$ is a beam waist radius of the laser beam focused on the end surface 3a of the fiber, the value $\eta_2$ becoming a maximum when $\omega_1 \times \omega_f$. That is, when the mode waist radius of the fiber 3 and the beam waist radius at the end surface 3a of the fiber are coincident to each other, the optical coupling efficiency $\eta$ of the fiber 3 becomes a maximum.

However, in a practical optical device, it often occurs that the beam waist focused by the lens does not coincide with the mode waist of the fiber 3 due to a displacement of relative positions of the light source 1, the lens 2 and the fiber 3. In particular, in the case of a removable connector type optical device in which the light source 1 and the lens 2 are arranged on a connector, and the fiber 3 is located on a plug, the aforesaid displacement in relative position may occur every time the plug and connector are separated and reconnected. When a relative positional displacement occurs, because the mode coupling coefficient $\eta_2$ is sensitively varied due to a displacement in a direction (a direction X) perpendicular to an optical axis $L_o$ between the optical axis $L_o$ of the laser beam and the fiber 3, even a slight displacement causes the coupling efficiency $\eta$ to be substantially varied.

A relation between the displacement amount Xo and the mode coupling coefficient $\eta_2$ is defined as $$\eta_2 = \frac{4}{\left(\frac{\omega_f}{\omega_1} + \frac{\omega_1}{\omega_f}\right)^2} \exp\left(\frac{-2X_0^2}{\omega_1^2 + \omega_f^2}\right)$$

where a relative displacement amount in a direction X between the optical axis Lo and the fiber 3 is defined as Xo. In view of the equation above, it is apparent that the relative displacement amount Xo may influence the mode coupling coefficient $\eta_2$ significantly.

The field radius $\omega_f$ of the elements influencing the mode coupling coefficient $\eta_2$ is defined by the fiber 3 and the beam waist diameter $\omega_1$ is defined by a magnification of the lens 2. That is, in the case that the magnification of the lens 2 is increased, the beam waist diameter $\omega_1$ is increased. In the case that the diameter $\omega_1$ is increased, the mode coupling coefficient $\eta_2$ is decreased, resulting in that the coupling coefficient $\eta$ is slightly deteriorated and a rate of variation of the mode coupling coefficient $\eta_2$ with respect to the aforesaid displacement amount Xo can be reduced and, at the same time, influence of the displacement amount Xo generated in case of fixing or removing of the connector against the coupling efficiency $\eta$ can be decreased. Thereby, an allowable degree for the positional displacement Xo can be increased when the beam waist diameter $W_1$ is increased.

However, upon increasing of the magnification of the lens 2, the slight variation of the relative position between the light source 1 and the lens 2 is amplified on the image forming side, thereby influencing image formation. That is, mere variation of the distance Y in the optical axis direction between the light source 1 and the lens 2 may cause substantial variation of the beam waist diameter $\omega_1$ and also the mere slight variation of the relative position between the light source 1 and the lens 2 toward the vertical direction in respect to the optical axis Lo causes the displacement amount Xo to be widely varied at the image forming side. In the aforesaid removable type connector, the light source 1 and the lens 2 are arranged at the same connector side, so that at a first stage of manufacturing, the light source 1 and the lens 2 must be assembled with the relative position between the light source 1 and the lens 2 being kept at quite high accuracy, resulting in that the manufacturing operation is not only complicated, but also the fine positional displacement may occur between the light source 1 and the lens 2 due to the variation of a linear expansion coefficient at the supporting part of the connector and this may have a substantial influence at the image forming side.

In view of the foregoing, an object of the present invention aims at an optional enlargement of a surface aberration at the focusing position of the light passed through the lens 2 as a method in which the variation of the aforesaid displacement amount Xo does not substantially influence variations of the mode coupling. coefficient $\eta_2$ without increasing the magnification of the lens 2. FIG. 6 illustrates schematically the light coupling state under this condition. In FIG. 6, Po indicates a variation of light converging rate of light at the beam waist when the surface aberration is minimized. In addition, Pm indicates a mode pattern of the fiber 3. In the case of the incident light shown at Po, it is apparent that the displacement amount Xo may substantially influence variations of the light coupling efficiency. In turn, the variation of the light collecting rate at the beam waist, when the surface aberration at the focusing position is enlarged, is indicated by P1. In this case, the image at the beam waist produces a certain non-focused image, and it is apparent that the relative displacement amount Xo of the fiber 3 provides less influence over the optical coupling efficiency.

Such a lens described above enables the optical surface 4 to be a non-spherical surface and the surface aberration at the focusing position can be increased under the design of the non-spherical surface shape. However, even in this case, the performance of the lens 2 must be maintained and the manufacturing of the lens and the evaluation of the lens parts must be carried out. However, the current evaluating method for determining the characteristics of the lens cannot be used to judge if the aberration of a lens is less than a predetermined aberration value or more than the predetermined value.

That is, as shown in FIG. 5, the general method for evaluating the performance of the lens in the prior art is performed such that the lens 2 is arranged between the interferometer 6 and the reference spherical surface 7, the interference between the incident light and the reflection light from the reference spherical surface is measured by the interferometer, and then the interference pattern is observed to confirm that the aberration is less than a predetermined value. In the evaluating method using the interferometer as described above, it is not possible to evaluate if the aberration of the lens at the focusing position is more than the predetermined value.

The present invention solves the aforesaid prior art problems and it is an object of the present invention to provide an optical coupling device in which a surface aberration at the incident position for the fiber is increased, and evaluation of the lens and the control of the lens can be carried out.

SUMMARY OF THE INVENTION

The optical coupling device of the present invention is characterized in that the light source is arranged at a short focusing position at the first optical plane, a non-spherical lens of which surface aberration becomes less than the predetermined value when the image is focused at the long focal point position at the second optical plane is used, the light source is arranged at the short focal point position with the second optical plane of the non-spherical lens being applied at the short focal point side, and then the light receiving part such as the incident part of the optical fiber is arranged at the long focal point position with the first optical surface being applied at the long focal point side.

With such an arrangement described above, it is preferable that when the light source is arranged at the short focal point position on the first optical surface side of the lens and the focusing is set at the long focal point position on the second optical surface, the light source is arranged at the short focal point position with the lens magnification of more than 3.5 times, an RMS value of the surface aberration is less than 0.04 λ when at a range of the lens magnification of more than 3.5 times, the numerical aperture for light incident to the first optical plane is less than 0.4, and the second optical plane is applied as the short focal point, and when the light receiving part such as the incident part of the optical fiber is arranged at the long focal point position with the second optical plane being applied at the long focal point side, the RMS value of the surface aberration at the range of the lens magnification more than 4 times and the numerical aperture for light incident to the first optical plane of less than 0.4 is more than 0.2 λ (provided that λ is a wave length of applied light).

In the aforesaid means, the light source is arranged at the first optical plane of the applied lens, focusing is set at the second optical plane, the lens variation is carried out to check whether the surface aberration at the focusing position is less than the predetermined value or not. Thus, during evaluation of the lens, it is satisfactory to measure if the surface aberration is less than the predetermined aberration value. Then, in the case that this lens is used in the optical device, the second optical plane is applied as the short focal point side and the light source is arranged at the focal point side. The first optical plane side is applied as the long focal point side and the light receiving part, such as the incident part of the fiber, is arranged at the long focal point position. The lens, manufactured to cause the surface aberration to be less than the predetermined aberration value, is arranged at the optical device in an opposite direction, thereby the surface aberration is increased at the incident part of the fiber to cause the image to be irregularly formed. Thus, even if the lens magnification is not increased more than that required, the variation of the optical coupling efficiency is made low in respect to a displacement in a direction crossing at a right angle with optical axes of the laser beam and the fiber.

DESCRIPTION OF THE PREFERRED EMBODIMENT

Figure 1:
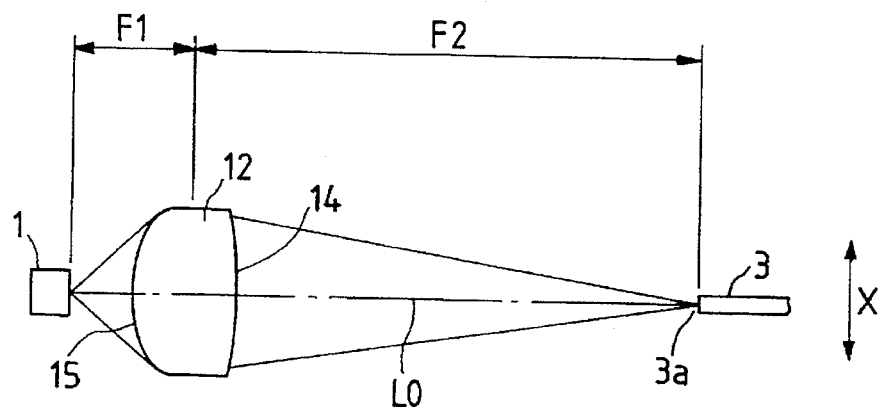
FIG. 1 is an illustration for showing a configuration of an optical device of one preferred embodiment of the present invention.

Referring now to the drawings, one preferred embodiment of the present invention will be described.

Figure 2:
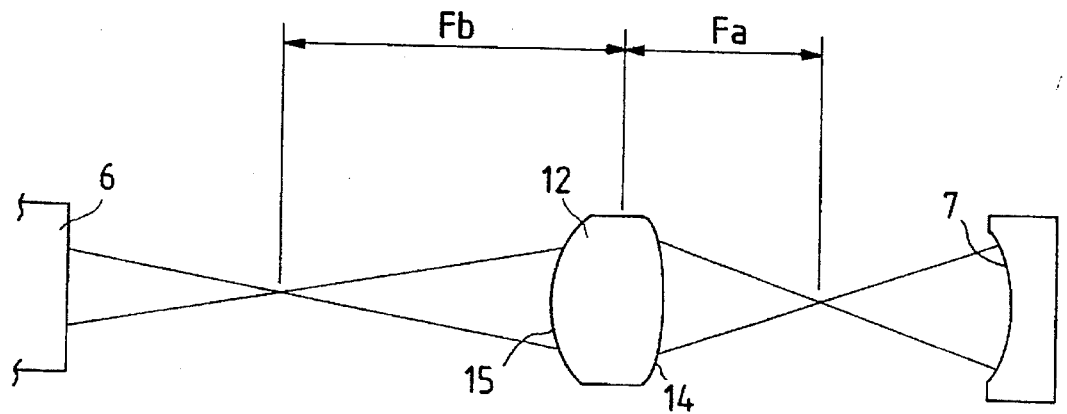
FIG. 2 is an illustrative view for showing an evaluating method for the lens.

FIG. 1 is a schematic illustrative view for showing an optical device of one preferred embodiment of the present invention and FIG. 2 is a schematic illustrative view for showing a method for evaluating the lens to be used.

The optical device shown in FIG. 1 is constructed such that the light source 1 and the lens 12 are fixedly mounted on a connector, and the fiber 3 is fixedly mounted on a plug. The plug and the connector are removably coupled.

The aforesaid lens 12 is a non-spherical lens, having a first optical surface 14 which is a spherical surface or a flat plane, and a second optical surface 15 which is an aspherical surface. When the lens is mounted on the connector, the second optical surface 15 faces the light source 1, which is located on the short focal point side (the focal distance F1) of the lens 12, and the first optical surface 14 faces an incident end 3a of the fiber 3, which is located on a long focal point side of the lens 12 (a focal point distance F2).

As shown in FIG. 2, when the quality of the aforesaid lens 12 is evaluated, the first optical surface 14 faces the light source placed at the short focal point distance Fa, and the second optical surface 15 faces the long focal point distance Fb. Then, the interferometer 6 and the reference spherical surface 7 are arranged. That is, the lens 12 is placed in a reverse direction opposite to its mounting position in the optical device and then the evaluation is carried out to check if the surface aberration at the focusing side is less than a predetermined RMS value. At this time, for example, it is defined such that the lens magnification is more than 3.5 times, the numerical aperture of light incident on the first optical surface 14 is less than 0.4 and the RMS value of the surface aberration in an acceptable lens is less than 0.04 $\lambda$, where $\lambda$ is a wave length of light of the light source 1.

In the case that the lens 12 evaluated as above is used in the optical device shown in FIG. 1 with the second surface 15 facing the light source 1 and the first surface 14 facing the interferometer 6, it is preferable that the RMS value of the surface aberration is more than 2 $\lambda$, the lens magnification is more than 4 times, and the numerical aperture of light incident to the first optical surface 14 less than 0.4. If the lens magnification is lower than 4 times, the beam waist radius $\omega_1$ at the end surface 3a of the fiber 3 is too low and the mode coupling coefficient $\eta_2$ of the fiber 3 is too low. If the RMS value of the surface aberration is lower than 0.2 $\lambda$, the variation rate of the mode coupling coefficient $\eta_2$ when the fiber 3 is displaced toward a direction crossing at a right angle with the optical axis Lo becomes too great.

Figure 3:
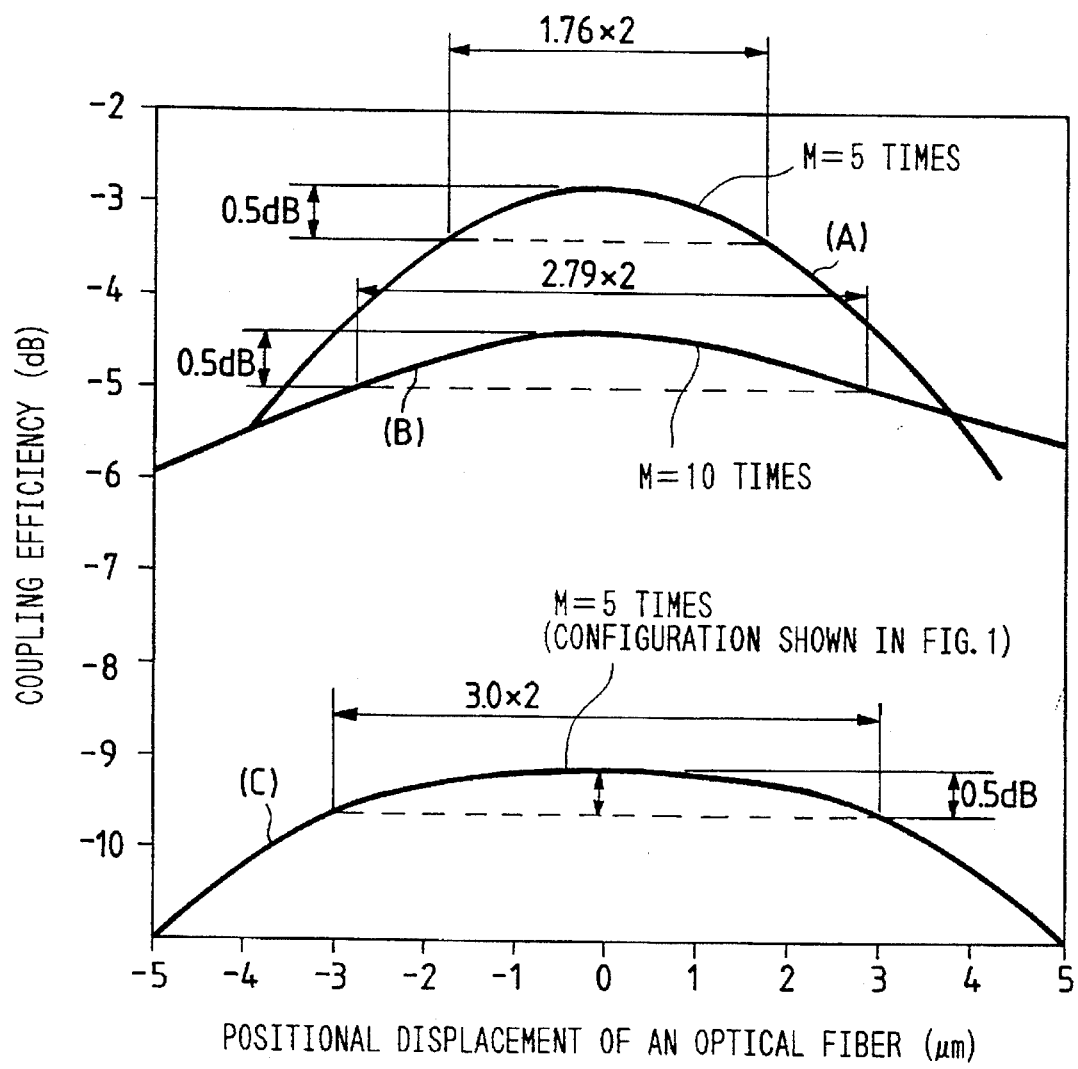
FIG. 3 is a line view for showing a relation between the coupling efficiency and the fiber at the present invention and the prior art.
Figure 4:
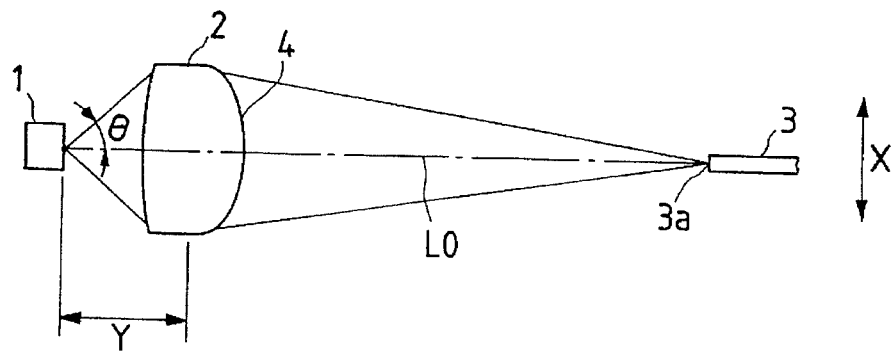
FIG. 4 is an illustrative view for showing a configuration of the optical device of the prior art.
Figure 5:
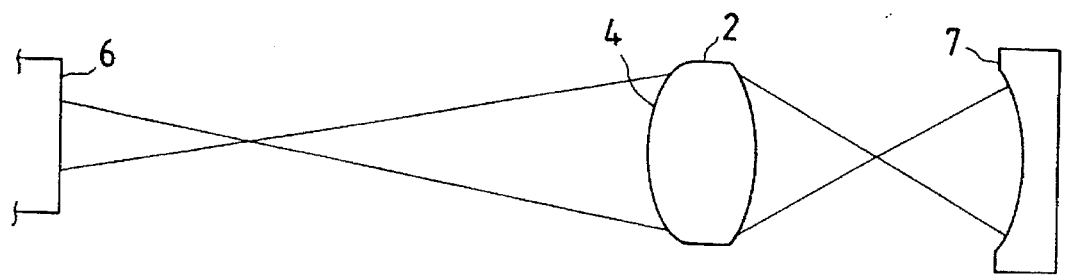
FIG. 5 is a schematic illustrative view for showing the method for measuring the spherical surface aberration of the prior art lens.
Figure 6:
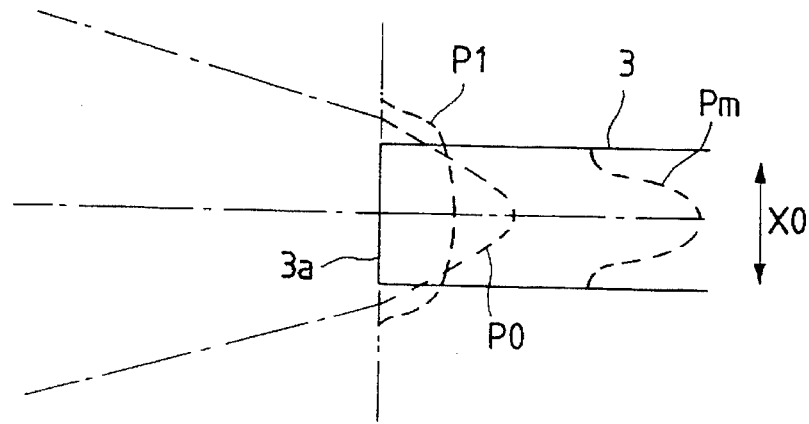
FIG. 6 is a schematic illustration for showing the state in which the optical device is connected to the fiber.

FIG. 3 is a line diagram for showing the effect of the present invention. The Y-axis indicates a coupling efficiency (dB) and its X-axis indicates a positional displacement amount ($\mu$m) in an X direction of the fiber 3 in respect to the optical axis Lo of the fiber 3.

For example, in the case that the wave length of the used light from the light source is of $\lambda=1.31$ $\mu$m and the half-angle value $\theta$ of the dispersion angle is 30° in the vertical or lateral width, the fiber 3 of a single mode width, the mode field radius of $\omega=5.2$ $\mu$m is used. In this case, when the lens magnification (M) is 5 times, the coupling efficiency is the maximum value. That is, it is assumed that the beam waist radius $\omega_1=5.2$ $\mu$m at the magnification of 5 times.

In the case that the first optical surface 14 of the lens is of a short focal point side and the second optical surface 15 is of a long focal point side, the allowable displacement amount of the fiber 3 in an X direction when the coupling efficiency is reduced by 0.5 dB by the fiber 3 is of Xo=±1.76 $\mu$m (see FIG. 3(A)). In the case that the magnification (M) of the lens 12 is 10 times without changing orientation of each of the optical surfaces 14 and 15, the allowable amount of displacement of the lens 12 in the X direction is enlarged to Xo=±2.79 $\mu$m when the coupling efficiency is reduced by 0.5 dB (see FIG. 3(B)). However, since the allowable amount of the positional displacement of the light source 1 in respect to the optical axis Lo is X1=(Xo/M), the value of X1=±0.352 $\mu$m under the magnification of M= 5, resulting in the magnification of M=10 causes the allowable amount of the positional displacement at the light source 1 becomes X1=±0.279 $\mu$m, the quite fine size is attained and it is difficult to keep the light source 1 and the lens 12 within this allowable range.

To the contrary, as shown in the preferred embodiment of the present invention, even if the first optical surface 14 is applied as a focusing side and the second optical surface 15 is applied as the light source 1 and the magnification of M=5 is applied, the allowable amount Xo of displacement of the fiber 3 when the coupling efficiency is reduced by 0.5 dB is enlarged to ±3.0 $\mu$m (see FIG. 3(C)). In addition, since the magnification is 5 times, the allowable amount X1 of the positional displacement of the light source 1 becomes ±0.6 $\mu$m and then the allowable amount of the positional displacement in respect to the light source 1 and the fiber 3 is increased.

With such an arrangement, even if the positional displacement in the X direction to the optical axis Lo and the fiber 3 under the removing operation of the fiber 3 through the connector system, the variation of the coupling efficiency is reduced more than that of the prior art.

In addition, in the case of the present preferred embodiment, the coupling efficiency is slightly reduced, so that the present invention may be adapted to the optical device for the middle distance optical communications in which a relative low efficiency is applied. In particular, since the present invention can be applied to the optical device of the removable type, the present invention can be applied to various devices.

In the preferred embodiment, if the optical surfaces 14 and 15 of the lens 12 are oppositely arranged to that of FIG. 1, present device can be applied to the device having a low allowable value of the surface aberration, resulting in that the lens can be used in both applications.

According to the present invention described in detail as above, the variation of the coupling efficiency of light in respect to the positional displacement of the fiber can be reduced. In addition, the evaluation of the lens can also be carried out in the same manner as that of the prior art and both designing of the lens and the evaluation of its quality can be performed.

What is claimed is:

1. A lens for focusing a light, the light having a wavelength, the light being emitted from a light source, the lens comprising:

a spherical surface formed on a first side of the lens; and an aspherical surface formed on a second side of the lens;

said lens defining an optical axis passing through the spherical and aspherical surfaces;

wherein the aspherical surface is formed such that when the light source is located at a first distance from the aspherical surface, light emitted by the light source is focused at a first focal point position, the first focal point position being located at a second distance from the spherical surface, the second distance being longer than the first distance, the aspherical surface having a surface aberration such that the light focused at the first focal point position has an aberration value greater than 0.2 times the wavelength of the light; and wherein the spherical surface is formed such that when the light source is positioned a third distance from the spherical surface, light emitted by the light source is focused at a second focal position, the second focal position being located a fourth distance from the aspherical surface, the third distance being shorter than the fourth distance, the light at the second focal point position having an aberration value less than 0.04 times the wavelength of the light.

* * * * *